(12) United States Patent
Ben-Hagai et al.

(10) Patent No.: US 12,306,807 B1
(45) Date of Patent: May 20, 2025

(54) FAST CREATION OF A FILE SYSTEM ENTITY

(71) Applicant: VAST DATA LTD., Tel Aviv (IL)

(72) Inventors: Ilan Ben-Hagai, Tel Aviv (IL); Vlad Zdornov, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/592,411

(22) Filed: Feb. 29, 2024

(51) Int. Cl.
*G06F 16/18* (2019.01)
*G06F 16/13* (2019.01)

(52) U.S. Cl.
CPC .......... *G06F 16/1865* (2019.01); *G06F 16/13* (2019.01)

(58) Field of Classification Search
CPC .............................. G06F 16/13; G06F 16/1865
See application file for complete search history.

(56) References Cited

U.S. PATENT DOCUMENTS

2017/0147571 A1* 5/2017 Kurichiyath .......... G06F 16/164
2021/0334237 A1* 10/2021 Coady ..................... G06F 16/18

\* cited by examiner

*Primary Examiner* — Loc Tran
(74) *Attorney, Agent, or Firm* — Reches Patents

(57) ABSTRACT

A method for creating a file system entity (FSE), the method includes (i) receiving, by a processing circuit of a storage system and from a client, a first request that is related to the FSE, while the FSE does not exist in the storage system; (ii) partially creating a FSE in the storage system, by the processing circuit, before a reception of a FSE creation request from the client; (iii) checking fulfillment of a condition associated with the FSE; and (iv) upon the fulfillment of the condition associated with the FSE, completing the creation of the FSE in the storage system, wherein the fulfillment of the condition includes receiving the FSE creation request from the client.

16 Claims, 3 Drawing Sheets

FAST CREATION OF A FILE SYSTEM ENTITY

BACKGROUND

Filesystem commands, such as commands for directory or file creation, trigger a process that involves multiple operations and may be time consuming, and therefore the client that sent the creation request may experience a long latency.

There is a growing need to speed up the creation of a file or directory.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
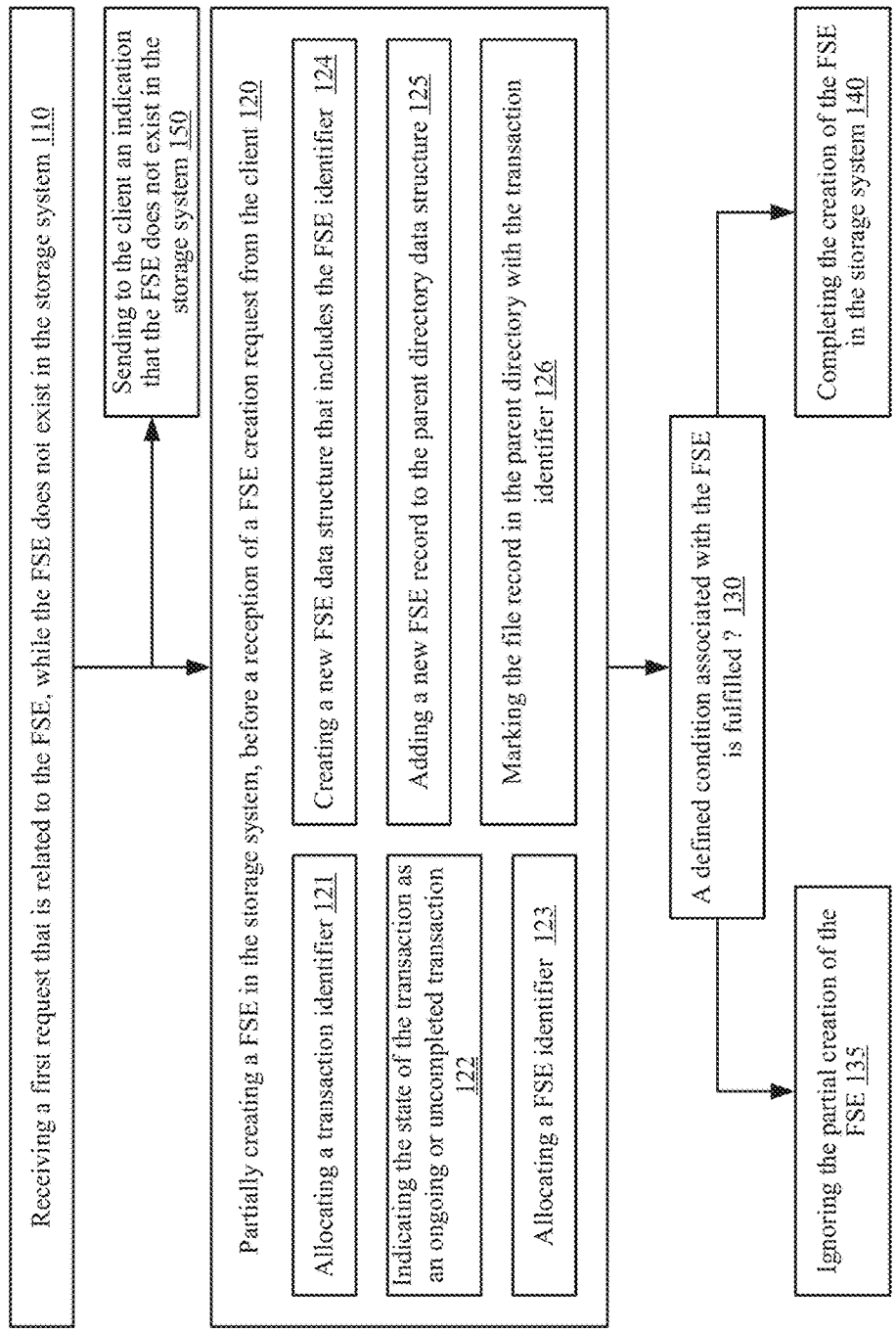
FIG. 1 is an example of a method.

According to an embodiment, a storage system assumes that there is a high probability of receiving a creation request for a certain filesystem entity (FSE, e.g., a file, directory, object, bucket), after receiving a certain request from the client, that is not a creation request and before the creation request is actually received.

It has been observed that quite often, when certain clients of the storage system send a first request that is associated with a pathname of a FSE, and the response to the first request indicates that the FSE does not exist, then-subsequently, a second request may be received from the client, for creating the FSE with the same name that was indicated in the first request.

The FSE pathname includes one or more strings that include a file/directory name and the parent directory name/pathname, rather than a protocol identifier for identifying the FSE (such as a NFS handle).

For example, NFS clients may send a lookup command for locating and obtaining a handle of a certain file or directory indicated by the lookup command, and if the lookup command fails to find the file or directory, the lookup command may be followed by receiving from the client a create command for creating the non-existing FSE.

According to an embodiment, the storage system monitors certain requests received from various clients (or communication ports or connections associated with clients) and whether these requests are followed by requests for creating FSEs having names included in the certain monitored requests. For example, once a lookup request is received, the communication port or connection through which the lookup is received, will be associated with the FSE name (or full pathname) indicated by the lookup request. If a subsequent create request is received, for creating a FSE with the same name under the same path, then-a score for the prediction is incremented to indicate an increased probability for receiving a create request after a lookup request from that client. If the subsequent request is not a create request for creating that file, then the score is decreased.

According to an embodiment, if the storage system detects that the majority of the certain monitored requests are followed by creation requests for the same FSE names that were indicated in the certain monitored requests-then the storage system may decide to start a transaction for creating the FSE and even perform most of the transaction's steps, whenever a request of a certain type that includes a FSE name is received and fails to find the FSE name under the indicated parent.

According to an embodiment, the transaction is completed and marked as committed in response to receiving a subsequent FSE creation request. The transaction will be rolled back if no creation request is received for the FSE name within a time window that follows the certain monitored request.

According to an embodiment, operations performed by the creation transaction will be ignored by subsequent access requests to access content of the parent directory, as long as the transaction is not committed. For example, if the transaction added an entry to the parent directory with the name of the potential new file, and the transaction is not yet committed, because no creation request was yet received (or received but execution of the creation was not completed), then a subsequent access to the parent directory for e.g., listing FSEs under the parent directory, will found a file record that was written by a transaction that is not committed, and will avoid adding the FSE name, indicated by the file record, to the response that includes the FSE list of the parent directory.

Suppose a lookup command (of the NFS protocol) is received, for looking up a file named "abc", under a parent directory identified by the lookup command. If no file with the name "abc" is found under the parent directory, then a response is sent to the client, indicating that the lookup failed to find the file, and without further delay, a new transaction is immediately started for creating a file with the name "abc" under the parent directory.

According to an embodiment, when starting a transaction (e.g., for creating a file or directory), a unique transaction identifier is assigned to the transaction, and a transaction data structure is updated with a new entry that includes the transaction identifier of the new transaction, and the state of the transaction that is set to 'uncommitted'. The transaction identifier may be indicative of the compute entity that executed the transaction, or the transaction entry may include the compute entity identifier as a separate field.

According to an embodiment, each update of a FSE, which is being updated by a transaction, is stamped with the transaction identifier.

According to an embodiment, when the transaction is completed, the transaction data structure is updated, so as to set the state of the transaction to committed. There is no need to remove (as part of completing the transaction) the transaction identifier that stamps the updates done by the transaction.

According to an embodiment, when a subsequent access, that is not related to the transaction, finds an update that is stamped with a transaction identifier, it checks the state of the transaction in the transaction data structure. If the transaction is in an uncommitted state or failed state, then it ignores the content.

Alternatively, the subsequent access request can wait for the transaction completion, by retrying the checking of the transaction's state. If the transaction is not completed within a certain time period—then it checks if the compute entity that executes the transaction is failed, and if so—it changes the transaction state to 'failed', and it ignores the update done by the failed transaction.

According to an embodiment, there is provided a background process that periodically scans the filesystem data structures for transaction stamps, removes the stamps of committed transactions, and remove updates of failed transactions.

According to an embodiment, the transaction includes at least part or even all of the operations that are usually performed for a file creation, but will not be committed at this stage.

According to an embodiment, the at least part of the operations includes:
 a. Allocating a transaction identifier and indicating the state of the transaction as an ongoing or uncompleted transaction (e.g., an uncommitted state).
 b. Allocating a FSE identifier (e.g., a NFS handle) that will serve as a reference to the FSE metadata and creating a new FSE data structure that includes the FSE identifier, and if the FSE is a file-setting default attributes of the potential new file.
 c. Adding a new FSE record to the parent directory data structure. The new FSE record includes the filename, e.g., "abc", or another representation of the name (e.g., a hash of the name) and the file identifier that refers to the new FSE data structure.
 d. In addition, the file record in the parent directory will be marked with the transaction identifier, so as to indicate that the file record is to be ignored by commands for listing the files and directories under the parent directory, at least until the transaction is marked as committed.

According to an embodiment, the default attributes that are set for the potentially new file are based on a monitoring that is performed on requests to set attributes of files from each client. Any time a set-attribute request is received from a client, these attributes are compared to previously attributes received from this client. If it is determined that the client is frequently using the same attributes for different files, then—these attributes can be used as the default attributes upon creation. When a subsequent set-attributes request is received from the client, with attributes that are considered as the client default attributes—then the client is acknowledged immediately, without a need to update the attributes.

According to an embodiment, when a file creation command is eventually received from the client, for creating the file having the filename "abc" under the parent directory, and a file record is found and indicated with a transaction identifier—additional operations related to the creation may be executed, using additional information included in the creation request, such as adding the additional information provided by the request to the metadata of the file or its parent.

According to an embodiment, if no additional information is included in the creation request—then no further operations are needed to complete the creation. Then—the transaction is marked as committed, and the creation request is acknowledged to the client, along with the file identifier (e.g., handle) that was created earlier by the transaction.

According to an embodiment, if the creation is still being processed when the creation request is received from the client, then the acknowledgement will be delayed until the creation is completed. i.e., when the transaction is marked as committed. Once the transaction of the creation is committed, any request for listing the directory's files will include the new file.

The transaction is associated with a timestamp indicating the start time of the transaction. The transaction timestamp is being checked by a background process that checks whether the transaction is in uncommitted state for a time that is longer than a time threshold (e.g., few seconds). If the transaction remains uncommitted, then—the transaction is marked as failed, and a subsequent access to list FSEs in the parent directory will ignore the file record associated with the failed transaction.

FIG. 1 illustrates an example of method 100 for creating a file system entity (FSE).

According to an embodiment, method 100 includes step 110 of receiving, by a processing circuit of a storage system and from a client, a request that is related to the FSE, while the FSE does not exist in the storage system. The request includes the FSE name or pathname that is indicative of the parent directory's name or pathname and the name of the FSE itself. In a case where the FSE does not exist, a response is sent to the client immediately, indicating the non-existence, before proceeding to the next steps. This request is also referred to as the first request—for distinguishing the request from a FSE creation request mentioned in relation to step 130 and/or step 140.

According to an embodiment, the request is not an FSE creation request. For example—the request may be an FSE lookup request.

According to an embodiment, step 110 is followed by step 120 of partially creating a FSE in the storage system, by the processing circuit, before a reception of a FSE creation request from the client.

According to an embodiment step 120 includes updating a file system metadata with FSE metadata.

According to an embodiment step 120 includes at least one of:
 a. Step 121 of allocating a transaction identifier.
 b. Step 122 of indicating the state of the transaction as an ongoing or uncompleted transaction (e.g., an uncommitted state).
 c. Step 123 of allocating a FSE identifier (e.g., a NFS handle) that will serve as a reference to the FSE metadata.
 d. Step 124 of creating a new FSE data structure that includes the FSE identifier, and if the FSE is a file-setting default attributes of the potential new file.
 e. Step 125 of adding a new FSE record to the parent directory data structure. The new FSE record includes the filename, or another representation of the name (e.g., a hash of the name) and the file identifier that refers to the new FSE data structure.
 f. Step 126 of marking the file record in the parent directory with the transaction identifier, so as to indicate that the file record is to be ignored by commands for listing the files and directories under the parent directory, at least until the transaction is marked as committed.

According to an embodiment—step 120 is triggered by the reception of the request. Thus—step 110 always triggers the execution of step 120.

According to another embodiment-step 120 is conditionally triggered by the reception of the request (of step 110).
 a. According to an embodiment, step 120 is triggered based on an identity of the client.
 b. According to an embodiment, step 120 is triggered based on a type of a client.
 c. According to an embodiment, step 120 is triggered based on an estimate that the client will send the FSE creation request following an indication that the FSE does not exist in the storage system. The estimate may be based on statistics of monitored past cases of creation requests that followed (or did not follow) the sending of the indication that the FSE does not exist in the storage system.

According to an embodiment, step 120 is followed by step 130 of checking whether a defined condition associated with the FSE is fulfilled.

According to an embodiment, step 130 is followed by step 140 of completing the creation of the FSE in the storage system upon a fulfillment of a defined condition associated with the FSE.

According to an embodiment, the fulfillment of the condition includes receiving the FSE creation request from the client. The fulfillment further includes the completion of step 120 of partially creating the FSE. In a case where step 120 is not completed when the FSE creation request is received, the steps required for completing the creation of the FSE—are delayed until step 120 is completed.

According to an embodiment, the fulfillment of the condition includes receiving the FSE creation request from the client at a point of time that follows the reception of the request of step 110 by a delay that does not exceed a defined delay threshold. In a case when the time lapses from the reception of the request of step 110 is longer than the defined delay threshold—the create transaction may be marked as failed, and/or the partial creation is deleted.

According to an embodiment, if the condition associated with the FSE is not fulfilled—step 130 is followed by step 135 of ignoring the partial creation of the FSE. The partial creation is ignored by subsequent requests that encounter updates that were done as part of the partial creation. The determination to ignore relies on the state of the transaction that is failed or uncommitted.

According to an embodiment, step 120 includes associating the FSE with an incomplete transaction (uncommitted transaction). The association may include writing the transaction identifier together with each update that is executed as part of the partial creation and marking the transaction state as incomplete transaction.

According to an embodiment, step 140 includes associating the FSE with a completed transaction. The association may include changing the state of the transaction to a completed transaction.

According to an embodiment, step 120 is also followed by step 150 of sending the indication that the FSE does not exist in the storage system to the client.

Method 100 provides an improvement in computer science as it reduces latency in the creation of FSE.

Figure 2:
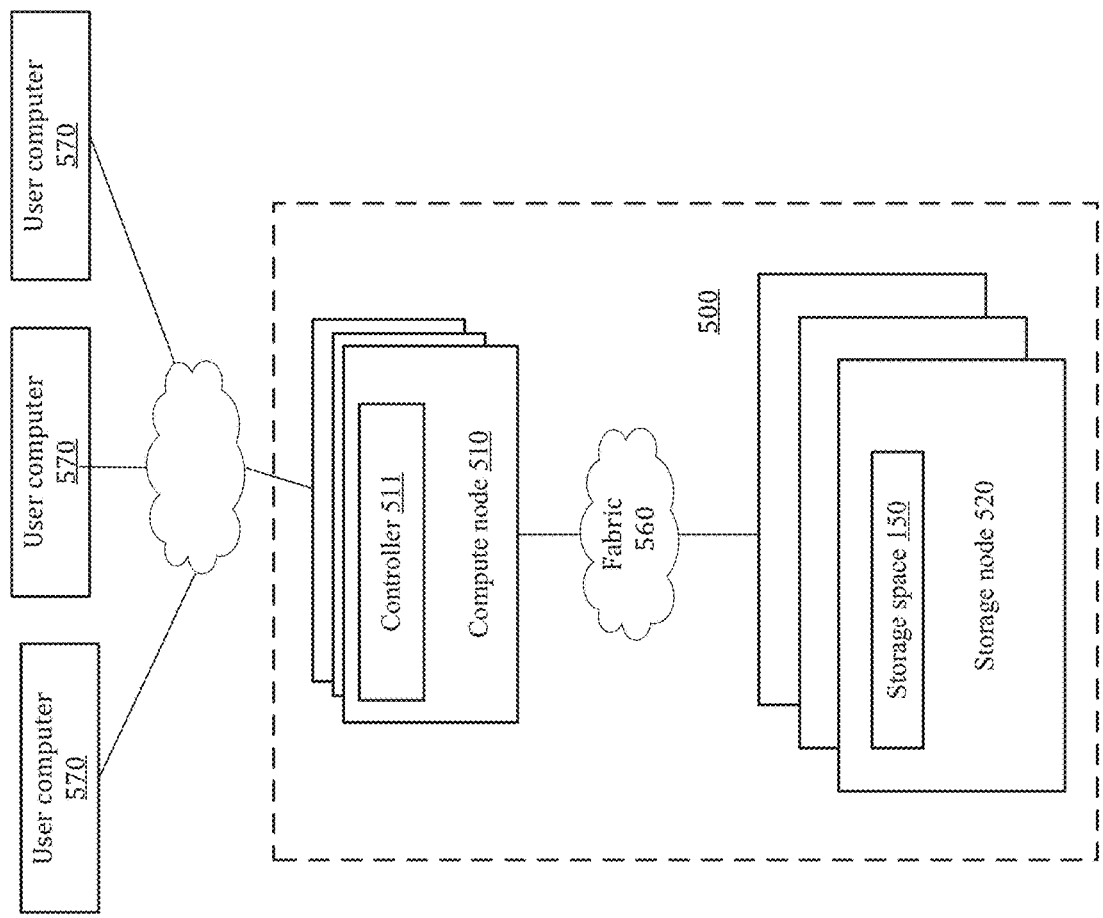
FIG. 2 is an example of a storage system.

FIG. 2 illustrates an example of a storage system 500. The storage system 500 includes one or more compute nodes 510. One or more compute nodes 510 include a controller 511 that is configured to execute method 100.

According to an embodiment, the controller is a hardware controller that can include a processing circuit, integrated circuits, a part of processing circuit, and the like. The processing/integrated circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 500 also includes one or more storage nodes 520, wherein each storage node includes storage devices for storing data, The storage devices may be Solid State Drives (SSDs), NVRAM (non-volatile random-access memory) devices, etc. The storage devices and particularly the NVRAM, may compose or include storage space 150.

The compute nodes 510 and the storage nodes 520 are connected through a communication fabric 560 for accessing stored data.

The compute nodes are connected to one or more user computers 570 that include the client side of one or more applications that access the storage system and send FSE creation requests and other requests related to FSEs.

Figure 3:
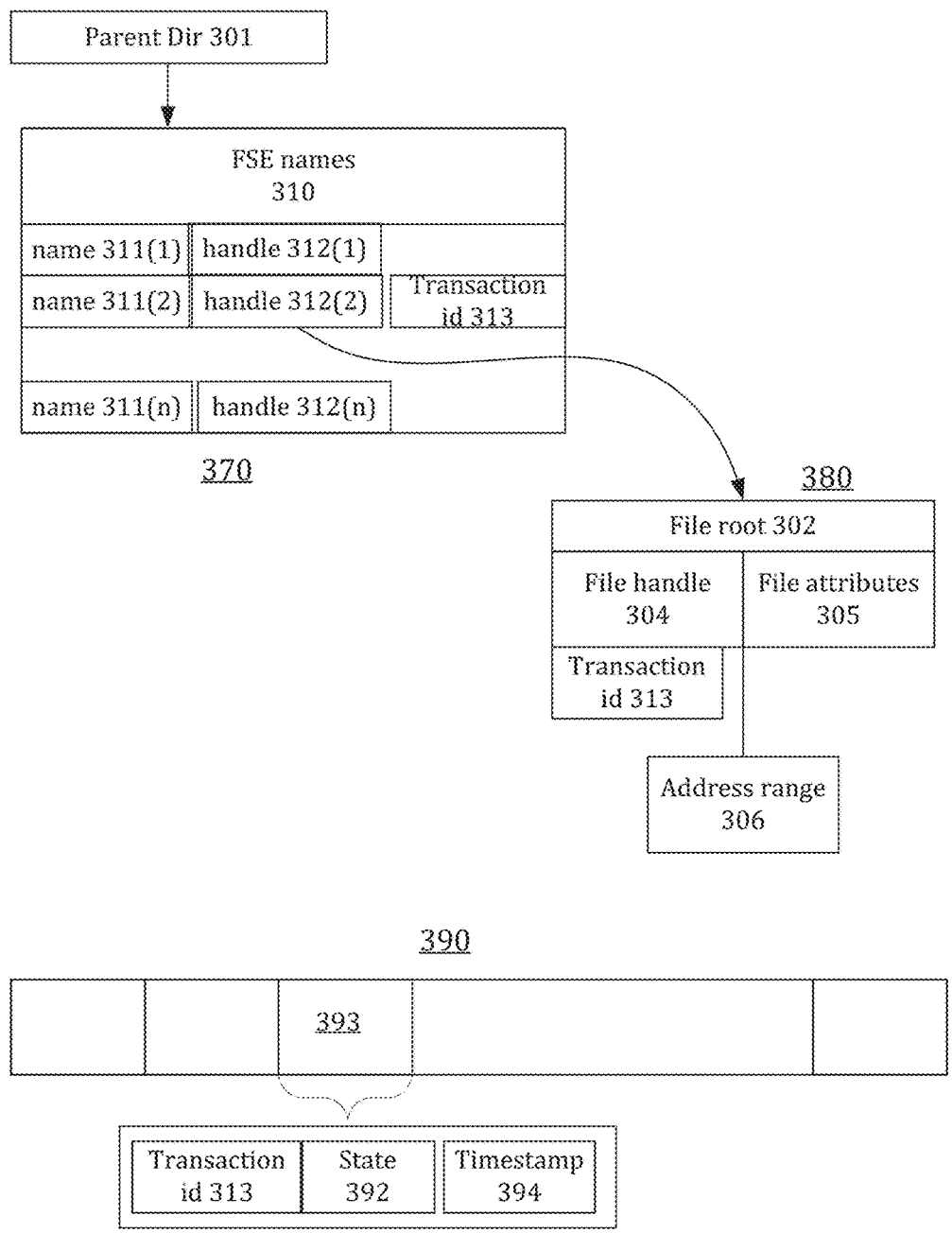
FIG. 3 is an example of a transaction data structure and data structures of filesystem entities.

FIG. 3 illustrates data structures that store file system metadata and are updated as part of executing method 100. The received request related to a FSE indicates a parent directory where the FSE is to be looked up. Data structure 370 includes metadata of the parent directory 301 that includes one or more blocks 310 with lists of names of FSEs stored under the parent directory. Each entry in the name list includes a name, such as name 311(1)-311(n), and each name is associated with a handle that points to the FSE metadata, such as handles 312(1)-312(n).

As part of step 120 for partially creating a FSE, an entry is added in the name list 310 for the potential new file (or directory), for example, the second record of the name list 310 is updated with a name 311(2), which is provided by the request related to the FSE. As part of step 120, a FSE identifier is created and written in the new file record, such as handle 312(2). A transaction identifier is also created and written in the new file record, such as transaction id 313.

Further as part of step 120, a new FSE data structure is created for storing the FSE metadata, such as file data structure 380, that is pointed by handle 312(2) at the parent directory. The file data structure may be composed of multiple blocks, all being created as part of step 120, such as file root 302, file handle 304 (having the same value as handle 312(2)), file attributes 305 that may be set with default values that are typical to the client that sent the request, and one or more address range block 306, that in the future will point to the file's data. The file data structure may be stamped with the transaction identifier 313.

Further as part of step 120, a new entry 393 is added to a transaction data structure 390 that includes multiple entries for multiple transactions. The transaction entry includes: the transaction identifier 313, the state 392, which is set to 'uncommitted' at step 120, and updated to 'committed' at step 140 when the completion of the creation is executed. The transaction entry further includes a timestamp 394 indicating the time when the transaction was started, so that if the transaction is detected to be uncommitted for a duration that exceeds a pre-defined threshold, it may be marked as 'failed', and any update that was performed as part of the partial creation may be deleted and/or ignored upon access without deletion.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for creating a file system entity (FSE), the method comprising:
   receiving, by a processing circuit of a storage system and from a client, a first request that is related to the FSE, while the FSE does not exist in the storage system;
   partially creating the FSE in the storage system, by the processing circuit, before a reception of a FSE creation request from the client, wherein the partially creating is triggered based on an estimate that the client will send the FSE creation request following an indication that the FSE does not exist in the storage system;
   sending the indication that the FSE does not exist in the storage system in response to the receiving of the first request;
   checking fulfillment of a condition associated with the FSE; and
   upon the fulfillment of the condition associated with the FSE, completing the creation of the FSE in the storage system, wherein the fulfillment of the condition comprises receiving the FSE creation request from the client.

2. The method according to claim 1, wherein the partially creating of the FSE comprises associating the FSE with an incomplete transaction.

3. The method according to claim 2, wherein the completing of the creation of the FSE comprises associating the FSE with a completed transaction.

4. The method according to claim 1, wherein the partially creating is triggered by the reception of the first request.

5. The method according to claim 1, wherein the partially creating is triggered based on an identity of the client.

6. The method according to claim 1, wherein the partially creating is triggered based on a type of a client.

7. The method according to claim 1, wherein the first request is a lookup command.

8. The method according to claim 1, wherein the partially creating of the FSE comprises updating a file system metadata with FSE metadata.

9. A non-transitory computer readable medium for creating a file system entity (FSE), the at least one non-transitory computer readable medium stores instructions for:
 receiving, by a processing circuit of a storage system and from a client, a first request that is related to the FSE, while the FSE does not exist in the storage system;
 partially creating a FSE in the storage system, by the processing circuit, before a reception of a FSE creation request from the client, wherein the partially creating is triggered based on an estimate that the client will send the FSE creation request following an indication that the FSE does not exist in the storage system;
 sending the indication that the FSE does not exist in the storage system in response to the receiving of the first request;
 checking a fulfillment of a condition associated with the FSE; and
 upon the fulfillment of the condition associated with the FSE, completing the creation of the FSE in the storage system, wherein the fulfillment of the condition comprises receiving the FSE creation request from the client.

10. The non-transitory computer readable medium according to claim 9, wherein the partially creating of the FSE comprises associating the FSE with an incomplete transaction.

11. The non-transitory computer readable medium according to claim 10, wherein the completing of the creation of the FSE comprises associating the FSE with a completed transaction.

12. The non-transitory computer readable medium according to claim 9, wherein the partially creating is triggered by the reception of the first request.

13. The non-transitory computer readable medium according to claim 9, wherein the partially creating is triggered based on an identity of the client.

14. The non-transitory computer readable medium according to claim 9, wherein the partially creating is triggered based on a type of a client.

15. The non-transitory computer readable medium according to claim 9, wherein the first request is a lookup command.

16. The non-transitory computer readable medium according to claim 9, wherein the partially creating of the FSE comprises updating a file system metadata with FSE metadata.

* * * * *